(12) United States Patent
Soares

(10) Patent No.: US 6,429,942 B1
(45) Date of Patent: Aug. 6, 2002

(54) USING A 2D DISPLACEMENT SENSOR TO DERIVE 3D DISPLACEMENT INFORMATION

(75) Inventor: Schubert F. Soares, Canon, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 09/407,805

(22) Filed: Sep. 28, 1999

Related U.S. Application Data

(60) Provisional application No. 60/102,158, filed on Sep. 28, 1998.

(51) Int. Cl.[7] .................................................. C01B 11/14
(52) U.S. Cl. ........................................................ 356/614
(58) Field of Search ............................ 356/51, 614, 615, 356/622

(56) References Cited

U.S. PATENT DOCUMENTS 5,002,396 A * 3/1991 Ozawa ........................ 356/622
5,162,811 A * 11/1992 Lammers et al. ........... 343/915
5,455,670 A * 10/1995 Payne et al. ................ 356/5.1

* cited by examiner

Primary Examiner—Richard A. Rosenberger
(74) Attorney, Agent, or Firm—Fish & Richardson P.C.

(57) ABSTRACT

A 2D displacement sensor is used to measure displacement in three dimensions. For example, the sensor can be used in conjunction with a pulse-modulated or frequency-modulated laser beam to measure displacement caused by deformation of an antenna on which the sensor is mounted.

17 Claims, 8 Drawing Sheets

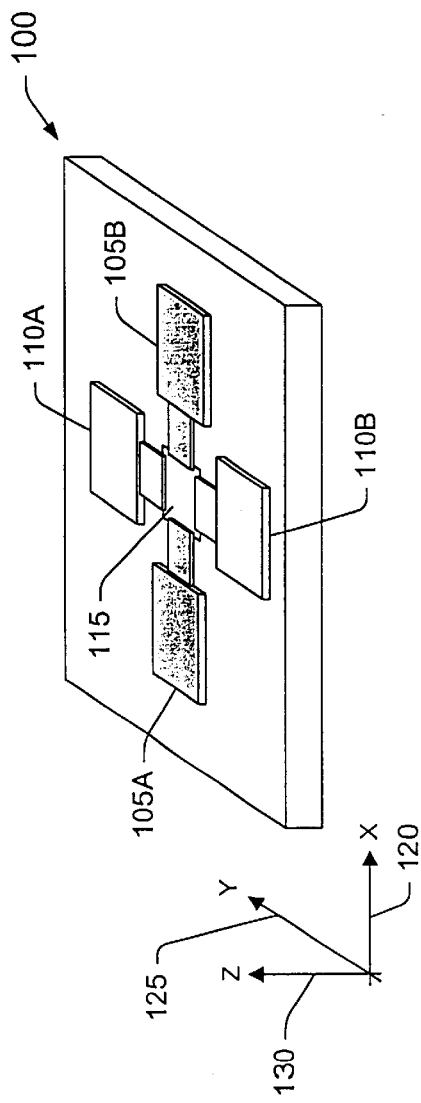
FIG. 3
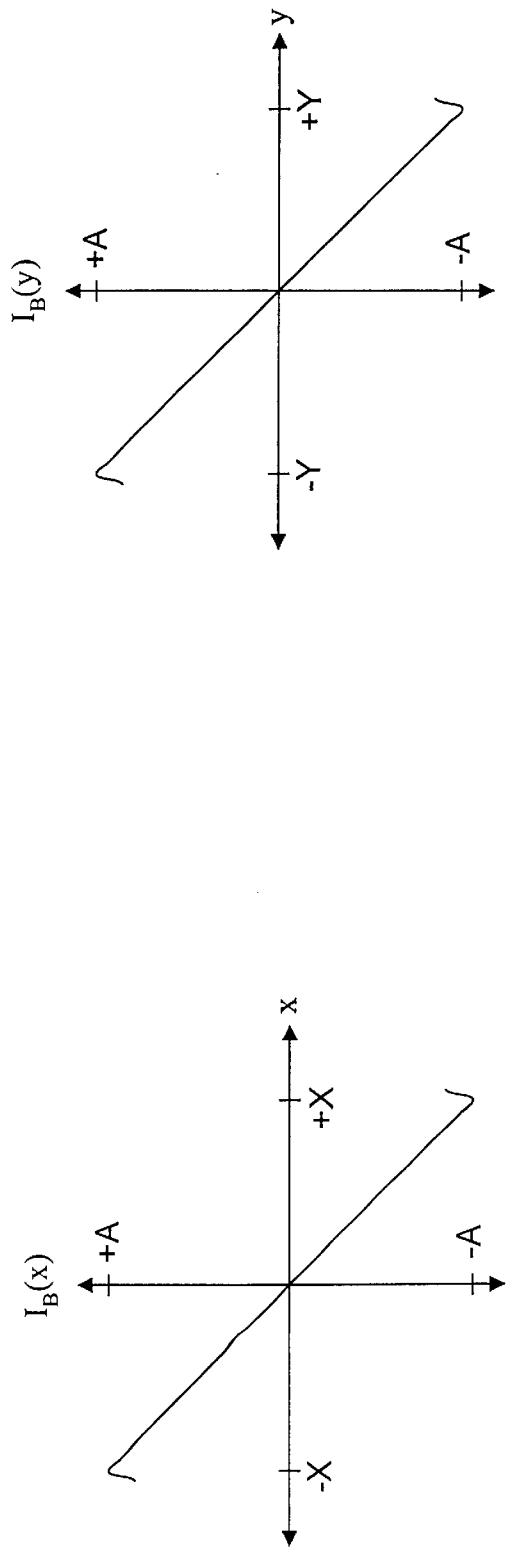
FIG. 4B
FIG. 4A

US 6,429,942 B1

USING A 2D DISPLACEMENT SENSOR TO DERIVE 3D DISPLACEMENT INFORMATION

CROSS-REFERENCE TO RELATED APPLICATION

This application claims the benefit of U.S. Provisional Application No. 60/102,158, filed on Sep. 28, 1998, which is incorporated herein by reference.

STATEMENT AS TO FEDERALLY SPONSORED RESEARCH

The invention described herein was made in the performance of work under a NASA contract, and is subject to the provisions of Public Law 96-517 (35 U.S.C. 202) in which the Contractor has elected to retain title.

TECHNOLOGICAL FIELD

This application relates to the use of displacement sensors in detecting mechanical motion.

BACKGROUND

In many signal acquisition systems, such as optical signal and RF signal acquisition systems, signal stabilization is critical for error-free data recovery. Signal stabilization is difficult to achieve when atmospheric or mechanical jitter exists in the acquisition system. Jitter can result both from movement of the signal source and movement of the signal reception system. For example, movement by a human operator is a common source of mechanical jitter in a video recording system, such as a handheld camcorder.

Signal reception systems used in interplanetary communication receive signals from distant sources at very high data rates. Those signals are often in the form of plane waves. The rates at which these systems can recover data accurately is limited by signal distortions that result from mechanical deformation and vibration of the reception systems. For earth-bound reception systems, common causes of mechanical deformation and vibration include gravitational weight redistribution during tracking and pointing, deflection caused by wind, thermal effects and gradients arising from solar heating and cooling, and stray mechanical resonance. The antennas in the U.S. deep space network, for example, include 34-meter and 70-meter mirrors that vibrate characteristically at a frequency of approximately 5–10 Hz with a deformation amplitude of approximately 1–2 cm.

SUMMARY

Recognition of the above led the inventor to develop a signal acquisition system capable of detecting displacement in three dimensions and correcting received signals to compensate for this displacement. The system is useful in a wide variety of applications, including interplanetary communication with very large antenna systems that are subject to a wide variety of sources of mechanical deformation and vibration. In these systems, incoming signals can be corrected to compensate for distortions introduced by deformation and. vibration of the antennas. This in turn improves data transmission and recovery, in part, by reducing link noise temperatures and increasing bit transmission rates.

In one aspect, the invention involves measuring physical displacement in three dimensions with a displacement sensor. An optical signal source produces an optical signal, such as a pulse-modulated or frequency-modulated laser beam, having a characteristic feature that varies with linear distance traveled by the optical signal. The displacement sensor is positioned to receive at least a portion of the optical signal. The sensor produces an output signal indicating a position at which the optical signal strikes the sensor in each of two orthogonal dimensions. The sensor itself is subject to displacement in a third orthogonal dimension, such as the displacement caused by deformation of an antenna on which the sensor is mounted.

Processing circuitry is coupled to the sensor to derive information about the characteristic feature of the optical signal at the target sensor. The processing circuitry applies this information in calculating a linear distance traveled by the optical signal in the third orthogonal dimension and then derives from the linear distance an amount by which the target sensor has been displaced in the third orthogonal dimension.

Other embodiments and advantages will become apparent from the following description and from the claims.

DESCRIPTION OF THE DRAWINGS

These and other aspects will now be described in detail with respect to the accompanying drawings, wherein:

FIG. 3. is a perspective view of a 2D displacement sensor.

FIGS. 4A and 4B are graphs showing the relationship between the position of an optical signal on a 2D displacement sensor and the current out of the sensor.

DETAILED DESCRIPTION

Figure 1:
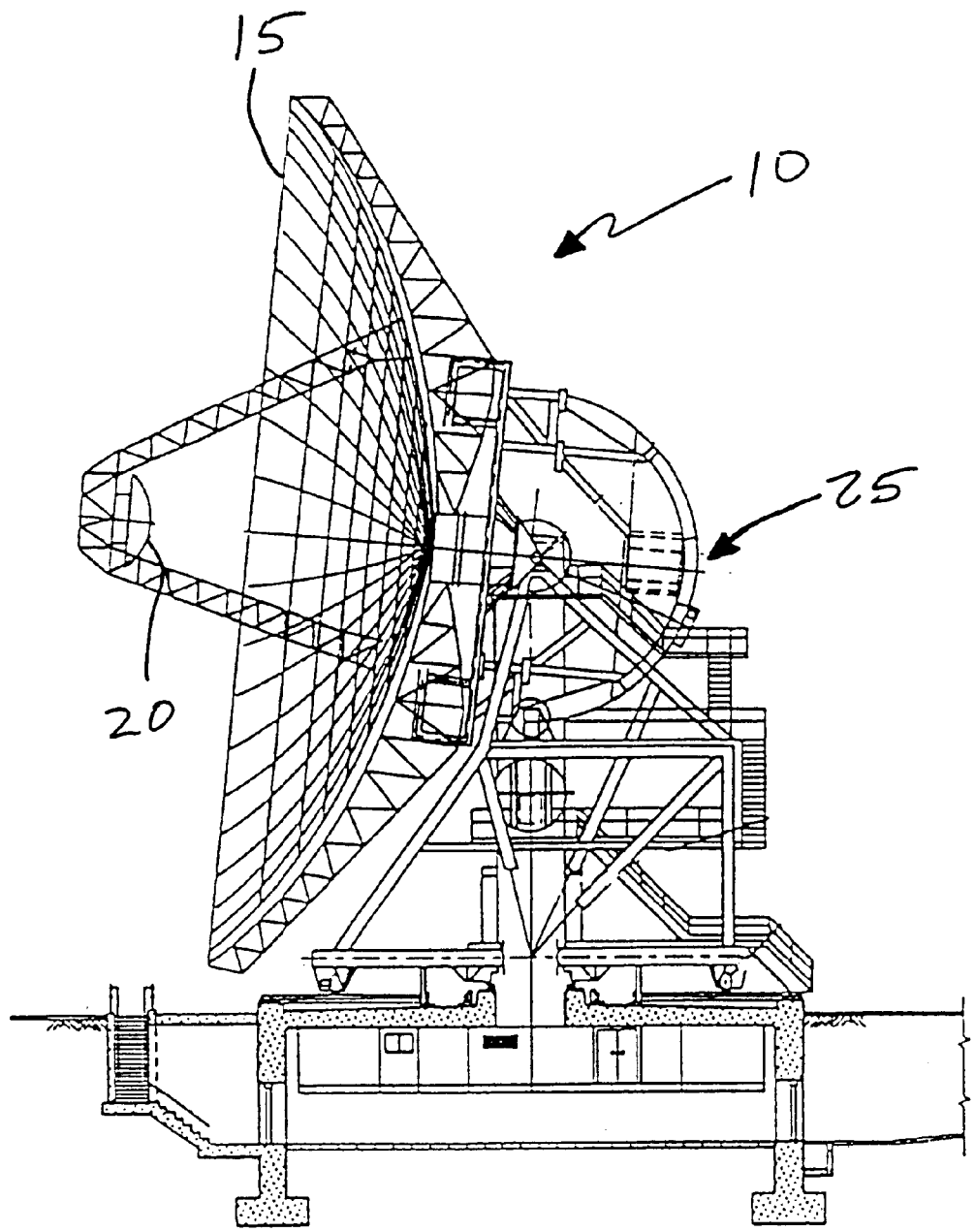
FIG. 1 shows a signal reception system, such as an antenna in the U.S. deep space network.

FIG. 1 shows an antenna 10 like those used in the U.S. deep space network. In general, the antenna 10 receives signals from space-based transmitters and recovers digital data from these signals. The antenna 10 includes a primary mirror 15 that captures and focuses the incoming signals. A secondary mirror 20 placed near the focal point of the primary mirror 15 redirects the signals toward a radio frequency (RF) receiver circuit that converts the incoming RF signals into intermediate frequency (IF) signals. A backing structure 25 supports the antenna 10 and prevents major deformation of the primary mirror 15. Various motors, bearings, and gear assemblies allow elevation and rotation of the antenna 10.

As described above, the antenna's primary mirror 15 is subject to mechanical deformation and vibration from a variety of sources, including redistribution of gravitational weight during tracking, wind, and solar thermal effects. Deformation reduces the accuracy with which data is recovered from the incoming signals and limits the communication data rate.

Figure 2:
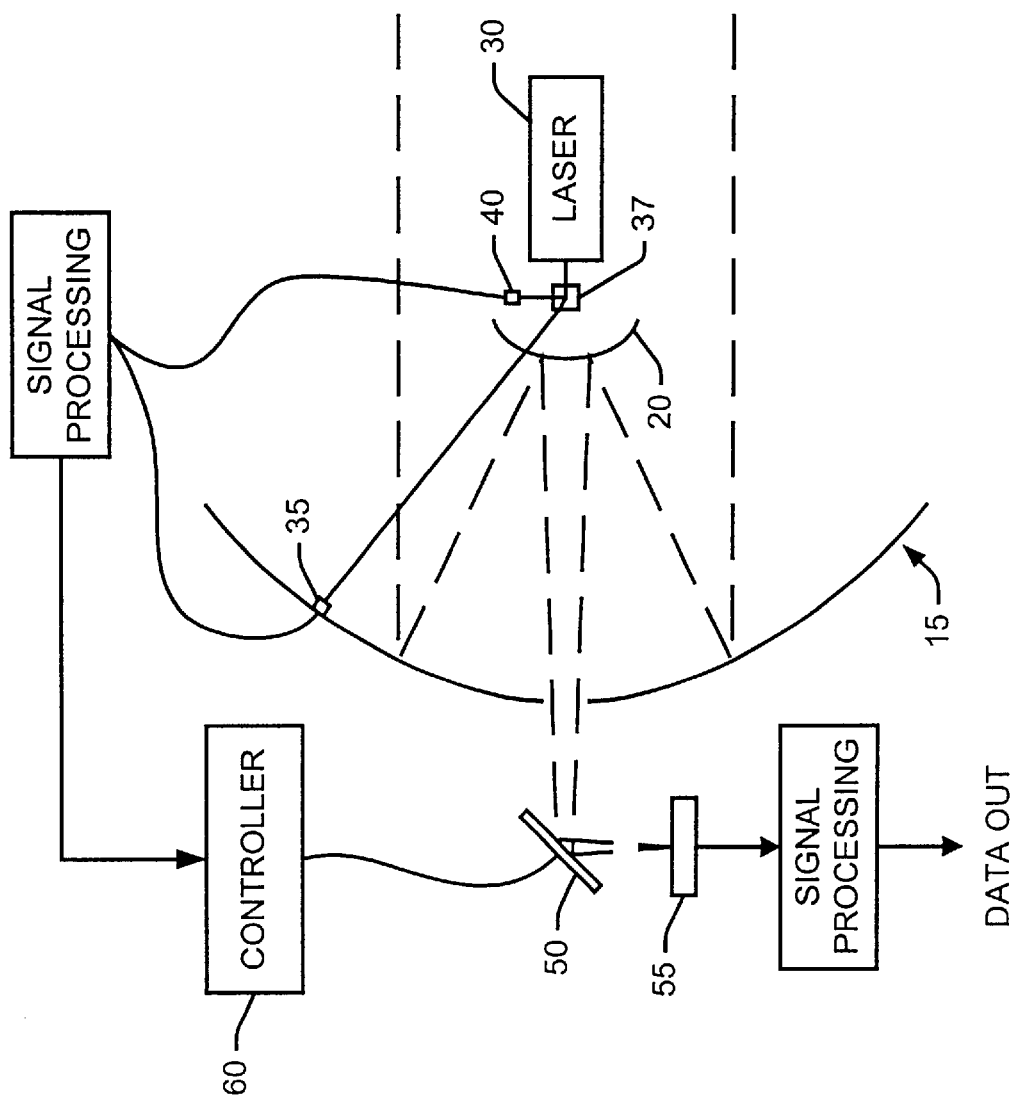
FIG. 2 is a schematic diagram of a signal reception system with components for correcting distortions caused by mechanical deformation in the reception system.

FIG. 2 illustrates a technique for automatically detecting and compensating for deformation and vibration of the antenna 10. A laser source 30 is placed at or near the focal point of the primary mirror 15. At least one optical sensor 35 is placed on the primary mirror 15 to receive a portion of the beam generated by the laser source 30. As described below, the to optical sensor 35 produces signals that are used by a signal processing circuit 45 in measuring the sensor's displacement with respect to the laser source 30 in three dimensions. These changes are usually caused by the deformation of the primary mirror. In some embodiments, another optical sensor, or "reference" sensor 40, placed at or near the laser source 30 generates signals that assist in measuring deformation in the antenna 10. An optical head 37, which typically includes one or more beam splitters, directs portions of the laser beam to the sensors 35, 40.

A signal correction device 50, such as a deformable mirror or a wave front correcting device, is placed in the path between the antenna's secondary mirror 20 and the RF receiving circuitry 55. The correction device 50 compensates for deformation in the antenna 10 by changing the shape of the incoming wave front in response to this deformation. An electronic controller 60, such as a programmable controller, generates a control signal that alters the characteristics of the correction device 50 as the deformation in the antenna 10 varies.

FIG. 3 shows one type of photo sensor 100 that is suited for use in deriving 3D displacement information. This photo sensor 100 is a conventional high-resolution, 2D displacement-type or position-type photo sensor having two pairs of Schottky-barrier contacts 105A, 105B, 110A, 110B comprising Schottky photodiodes. The contacts 105A, 105B, 110A, 11B in each pair enclose a two-dimensional photosensitive area exposing a semiconductor surface 115. As an optical signal impinges on the semiconductor surface 115, the contact pairs 105A, 105B, 110A, 110B produce two short-circuit current or open-circuit voltage signals, I(x) and I(y), the amplitudes of which indicate the relative position of the optical signal between the contacts in the pair. Therefore, each contact pair 105A, 105B, 110A, 110B indicates the position of the optical signal in one of two orthogonal dimensions, defined by an x-axis 120 and a y-axis 125.

FIG. 4A shows the relationship between the amplitude of the signal I(x) and the position at which the optical signal strikes the semiconductor surface of the photo sensor. The signal I(x) varies approximately linearly with the position x of the optical signal between the contacts in the pair 105A, 105B lying. along the x-axis 120. At x=−X, the signal I(x) has a value of approximately +A; at x=+X, the signal has a value of approximately -A; and between the two ends, at x=0, the signal has a value of approximately zero.

Likewise, FIG. 4B shows that the signal I(y) varies approximately linearly with the position y of the optical signal between the contacts in the pair 110A, 110B lying along the y-axis 125. At y=−Y, the signal I(y) has a value of approximately +A; at y=+Y, the signal has a value of approximately −A; and between the two ends, at y=0, the signal has a value of approximately zero.

The following U.S. patent and publications describe the structure, fabrication, and operation of suitable photosensors: (1) U.S. Pat. No. 4,987,461, issued Jan. 22, 1991; (2) S. D. O' Connor & S. F. Soares, "Picometre displacement tracking of an optical beam in a silicon Schottky barrier sensor," Electronics Letters, Vol. 30, No. 22, Oct. 27, 1994; (3) K. A. M. Scott et al., "A High resolution Si position sensor," Applied Physics Letters, Vol. 62, No. 24, Jun. 14, 1993; (4) S. F. Soares, "Photoconductive Gain in a Schottky Barrier Photodiode," Japanese Journal of Applied Physics, Vol. 31, Part 1, No. 2A, February 19:92; and (5) B. W. Mullins et al., "A Simple High-Speed Si Schottky Photodiode," ,IEEE Photonics Technology Letters, Vol. 4, No. 4, April 1991. The sensors described in these publications are relatively simple and inexpensive to manufacture, costing as little as pennies per unit.

In detecting and measuring deformation in an antenna, the 2D photo sensor 100. is used in a manner that allows the derivation of 3D displacement information from the photo sensor 100. In particular, the signals from the photo sensor 100 are used to derive information about the photosensor's position along a z-axis 130, which extends in a direction orthogonal to the x and y-axes 120, 125. The photosensor's position along the z-axis 130 indicates the amount of physical separation between the antenna's primary mirror and the laser source placed near the antenna's secondary mirror.

Figure 5:
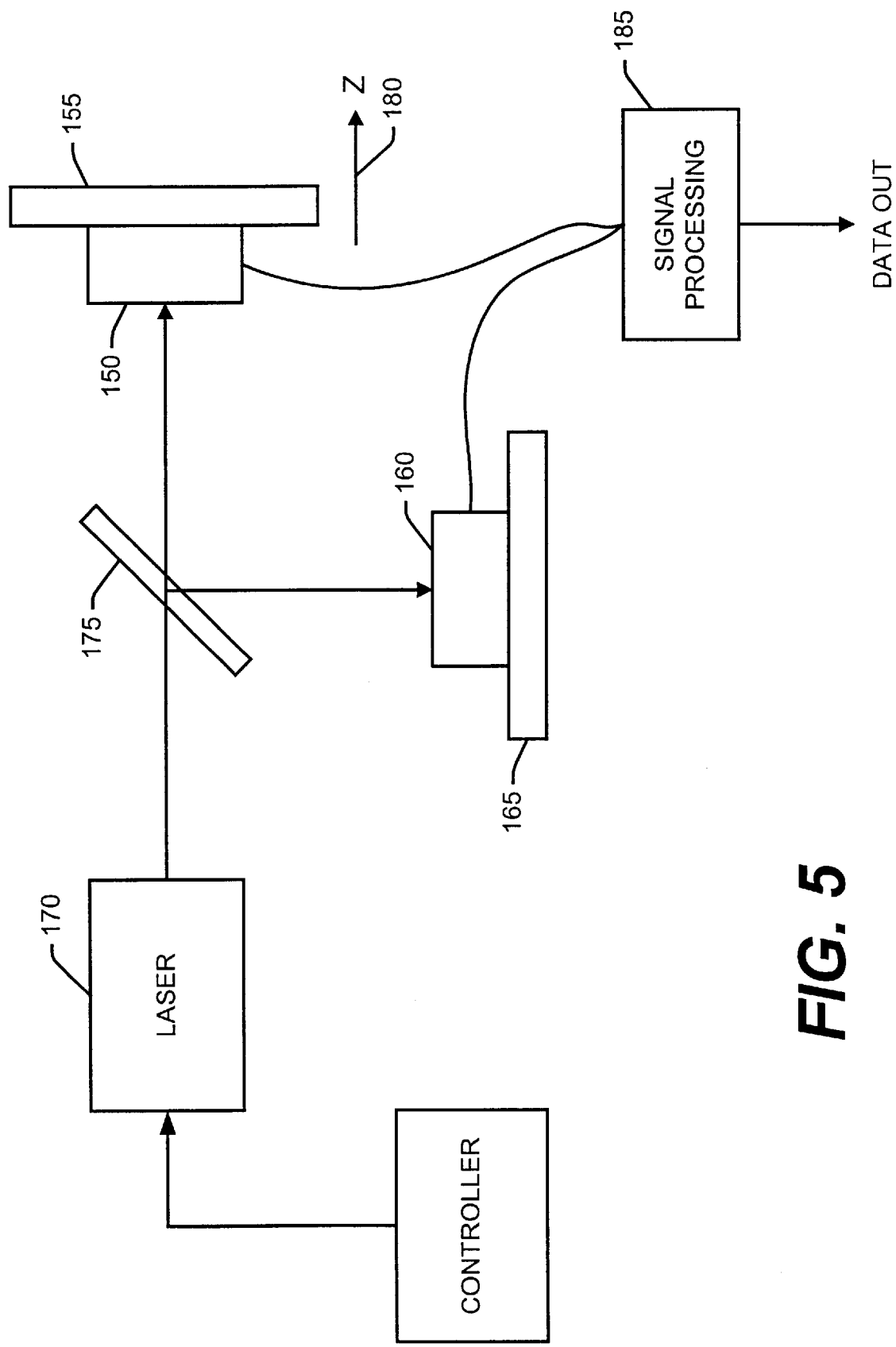
FIG. 5 is a schematic diagram of a system for use in deriving 3D displacement information from a 2D displacement sensor.

FIG. 5 shows a hardware configuration. for use in deriving 3D displacement information from a 2D displacement sensor 150. The displacement sensor 150 is mounted to a surface-of-interest 155, such as the primary mirror of an earth-bound antenna, for which displacement information is needed. Another displacement sensor, or "reference" sensor 160, is mounted to a reference surface 165. The displacement of the surface-of-interest 155 is measured with respect to the position of the reference surface 165. In an earth-bound antenna, the reference surface 165 is usually very near the antenna's secondary mirror. A laser source 170 is mounted near the reference sensor 160 at a position that is fixed with respect the reference sensor 165. In an antenna, the laser source 170 can be mounted behind the antenna's secondary mirror as long as the mirror is formed from a material that transmits the light beam emitted by the laser source 170.

The beam emitted by the laser source 170 passes through a beam splitter 175 that directs a portion of the beam toward the reference sensor 160 and a portion toward the sensor 150 mounted on the surface-of-interest 155. Any displacement of the surface-of-interest 155 with respect to the reference surface 165 along the sensor's z-axis 180 alters the amount of time required for the beam to reach the sensor 150.

The laser source 170 emits a stream of pulses, instead of a continuous beam. This causes the two sensors 150, 160 to produce pulsed output signals. Because the laser source 170 is closer to the reference sensor 160 than it is to the sensor 150 on the surface-of-interest 155, the laser pulse reaches the reference sensor 160 before it reaches the other sensor 150. This causes a delay between the signal pulses produced by the two sensors. A signal processing circuit 185 is connected to receive the pulsed output signals from the sensors 150, 160 and measures displacement of the surface-of-interest 155 in the z-direction by calculating changes in this delay. An electronic controller 190 controls the pulse modulation of the laser beam.

Figure 6A:
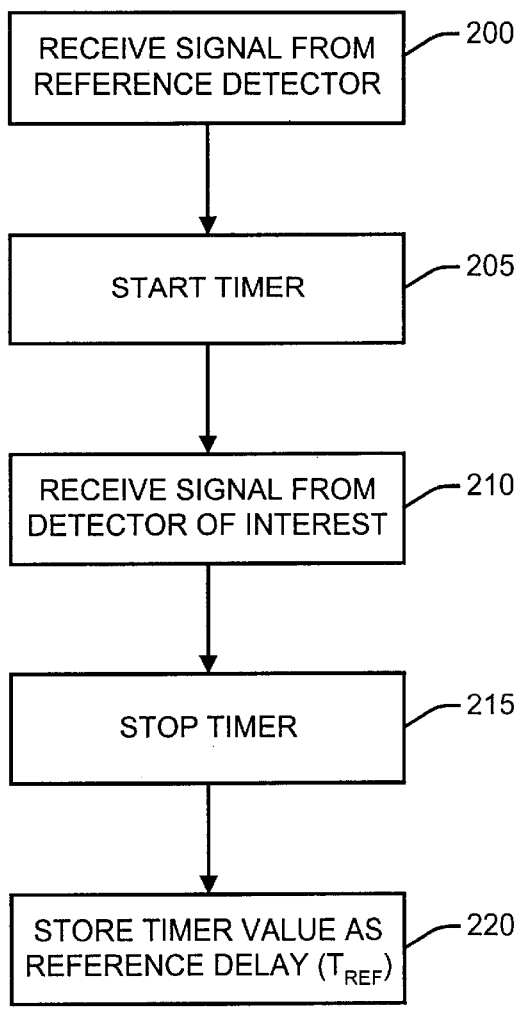
FIGS. 6A and 6B are flow charts of a process for deriving 3D displacement information from a 2D displacement sensor.
Figure 6B:
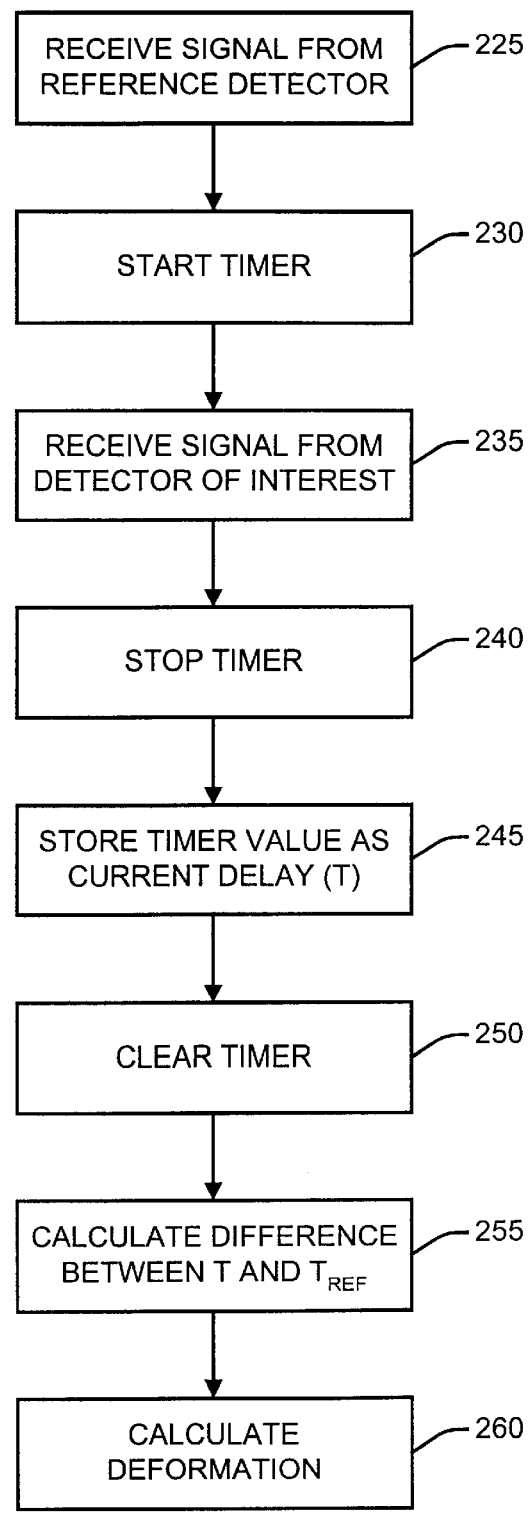

FIGS. 6A and 6B illustrate one technique for using the hardware configuration of FIG. 5 to measure displacement along the z-axis. In some embodiments, these steps are carried out in the signal processing circuit 185 (FIG. 5). The processing circuit first calculates the normal delay, or reference delay, between signal pulses from the two sensors when the surface-of-interest is at a resting position, i.e., when the deformation of the surface is at a minimum. In doing so, the processing circuit receives a signal pulse from the reference sensor 160 in response to a laser pulse generated by the laser source (step 200). Upon receiving the signal pulse, the processing circuit starts a timer (205). A short time later, the processing circuit receives a corresponding signal pulse from the sensor 150 mounted to the surface-of-interest (step 210). The processing circuit stops the timer upon receiving this signal pulse (step 215) and then stores the timer value as the reference time delay $T_{REF}$ (step 220).

In detecting and measuring subsequent displacement of the surface-of-interest with respect to the reference surface, the processing circuit receives a series of signal pulses generated by the reference sensor 160 in response to a series of laser pulses from the laser source (step 225). The processing circuitry starts the timer upon receiving each of these signal pulses (step 230). For each signal pulse received from the reference sensor 160, the processing circuitry receives a corresponding signal pulse from the sensor 150 mounted to the surface-of-interest (step 235). The processing circuitry stops the timer upon receiving each of these signal pulses (step 240) and, upon stopping the timer, stores the timer value as the current time delay T between signal pulses (step 245). The processing circuitry clears the timer after each of these signal pulses (step 250).

For each pair of corresponding pulses from the two sensors, the processing circuit calculates the difference $T_A$ between the time delay T for those pulses and the reference time delay $T_{REF}$ (step 255). The processing circuit uses this difference $T_A$ to calculate the displacement D of the surface-of-interest in the z-direction (step 260), applying the following equation:

$$D=C_{air}(T_A),$$

where $C_{air}$ represents the velocity of light in air.

Figure 7:
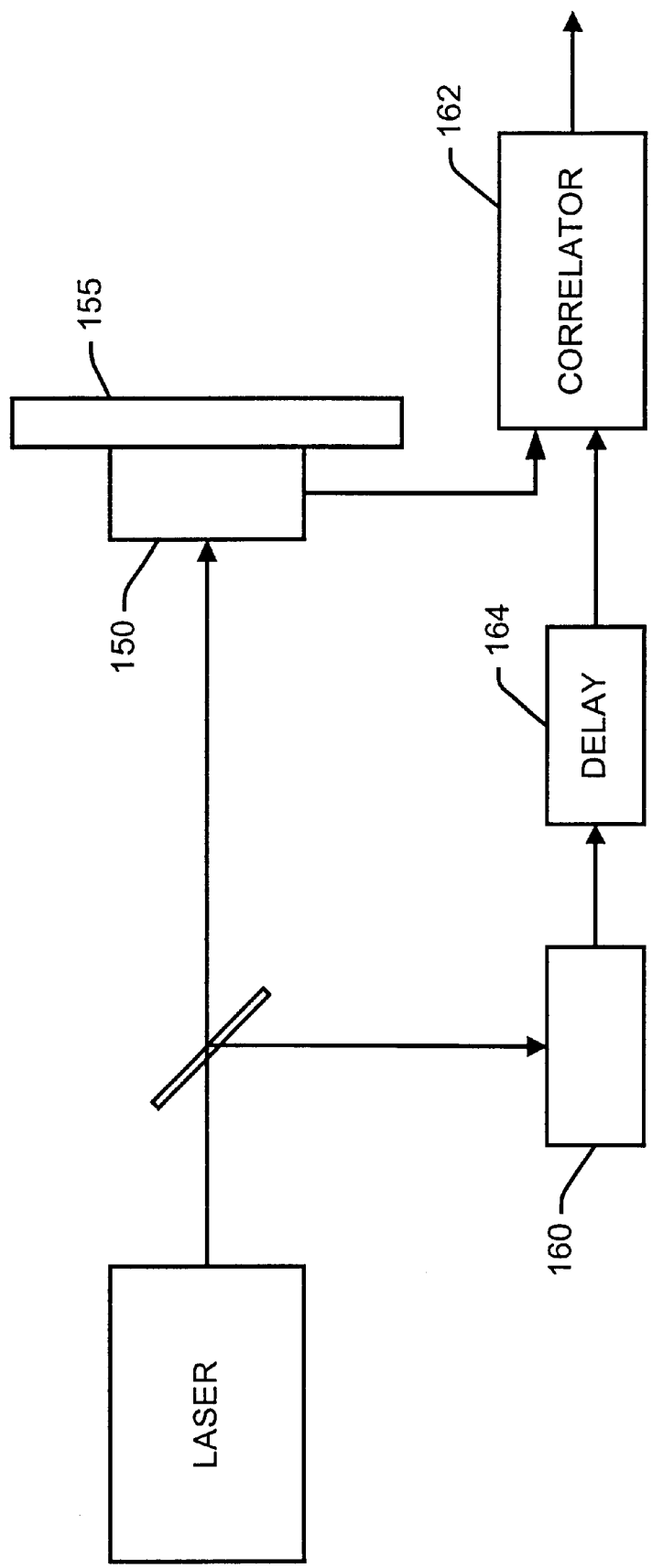
FIG. 7 is a schematic diagram of another technique for use in deriving 3D displacement information from a 2D displacement sensor.

FIG. 7 shows an alternative technique for measuring displacement along the z-axis. Instead of using a timer to measure delay between the signal pulses from the reference sensor 160 and the target sensor 150, this technique applies a correlation algorithm to detect misalignment between the signal pulses. In this embodiment, the system includes a correlation element 162 connected to receive the signal pulses from the sensors 150, 160. A delay element 164 is placed between the reference sensor 160 and the correlation element 162.

The delay element 164 applies a time delay that, when the surface-of-interest is experiencing no. deformation, causes each signal pulse from the reference sensor 160 to reach the correlation element 162 at the same time as the corresponding signal pulse from the target sensor 150. When no deformation exists, the correlation element 162 produces an output signal having a value indicating that the two signal pulses are aligned. When deformation does exist, the signal pulses do not align, and the value of the output signal from the correlation element 162 indicates the amount of decorrelation between the two signal pulses. This decorrelation value provides a direct indication of the deformation of the surface-of-interest. Common technologies for implementing the correlation element 162 include digital electronic circuitry and program code executed by a programmable processor.

Figure 8:
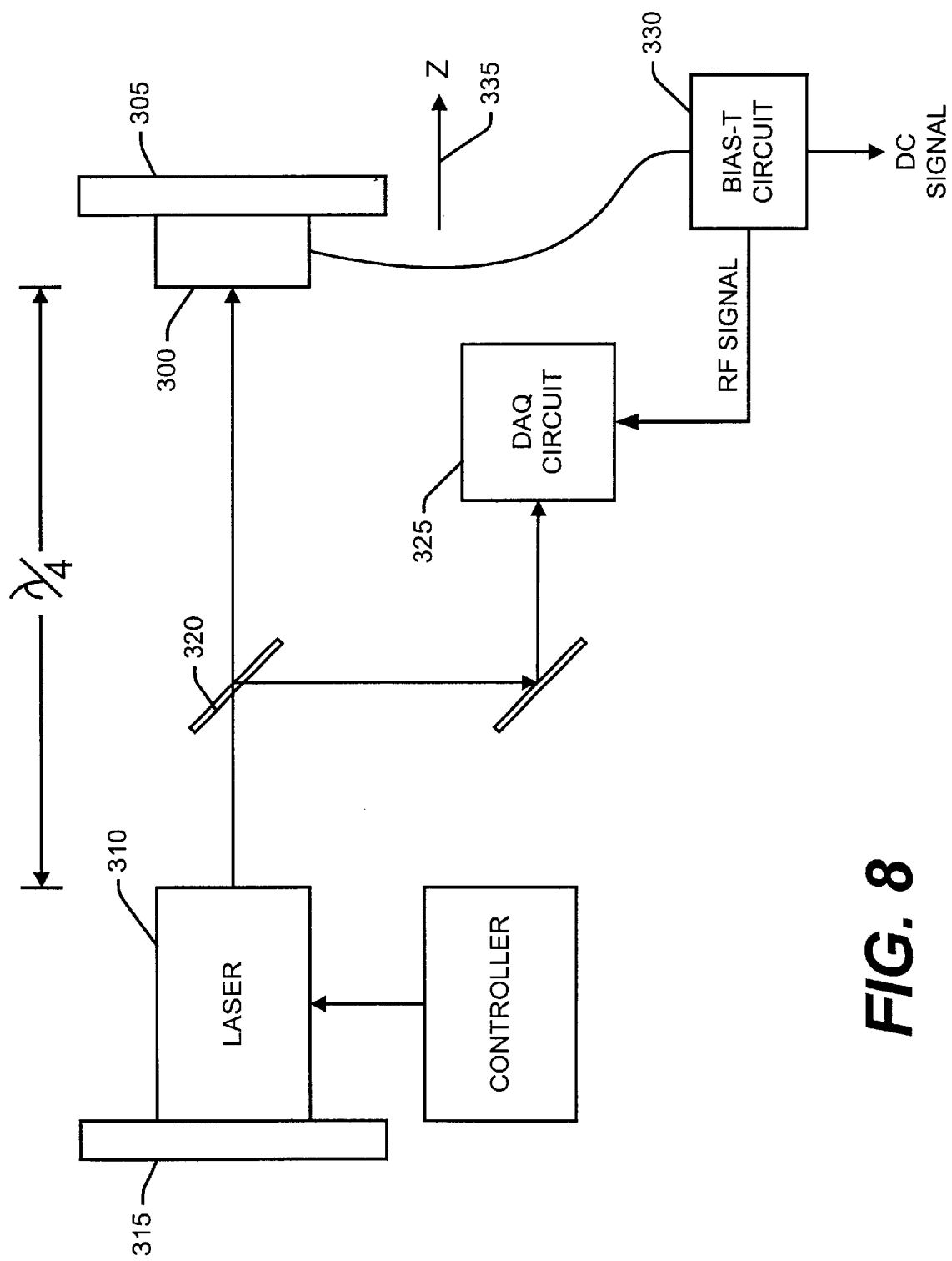
FIG. 8 is a schematic diagram of another system for use in deriving 3D displacement information from a 2D displacement sensor.

FIG. 8 shows another hardware configuration for use in deriving 3D displacement information from a 2D displacement sensor 300. In this configuration, the displacement sensor 300 is mounted to the surface-of-interest 305, and a laser source 310 is mounted to a reference surface 315. The laser source 310 emits a frequency-modulated beam.

A beam splitter 320 directs a portion of the beam to a phase measurement circuit, such as a data acquisition (DAQ) circuit 325, over a constant-length optical path. The DAQ circuit calculates the phase of the laser beam at the laser source. The beam splitter 320 also directs a portion of the frequency-modulated laser beam toward the displacement sensor 300. The output signal produced by the displacement sensor 300 includes a direct-current (DC) component that indicates the x,y-position of the beam on the photosensitive surface of the sensor 300 and a radio-frequency (RF) component that indicates the phase of the frequency-modulated beam at the sensor 300.

The sensor's output signal is delivered to a discrimination circuit, such as a microwave module, or "bias-T" circuit 330. The bias-T circuit 330 separates the DC and RF components of the sensor's output signal and transmits the RF component to the DAQ circuit 325. The DAQ circuit 325 extracts phase information from the RF signal and calculates the phase difference between the laser source 310 and the sensor 300. Because the laser beam is modulated at a known frequency, the displacement of the sensor 300 along its z-axis 335 can be calculated directly from the phase difference.

The accuracy of the displacement measurement is idealized if the phase of the modulated laser source is less than $\pi/4$ with respect to the maximum expected displacement of the sensor, at the lower limit, or with respect to one-quarter of the antenna's diameter, at the upper limit. In general, the modulation frequency is selected to fall between these two limits. This ensures that phase measurement occurs at a phase angle significantly less than $\pi/4$, which corresponds to the linear portion of the modulation wave, where $\sin(\theta) \geq \theta$. For an antenna having a diameter of 100 meters and a laser source placed at the focal point of the primary mirror, the lower limit for the modulation frequency is approximately 24 MHz. For an antenna with a maximum expected displacement of 2 cm, the upper limit for the modulation frequency is approximately 3.75 GHz.

Other embodiments combine a technique similar to that shown in FIG. 7 with frequency or phase modulation of the laser beam. In particular, a portion of the frequency-modulated or phase-modulated beam passes through a delay element. When no deformation exists, the output signal from the target sensor 300, upon reaching the correlation element, has the same phase as the beam exiting the delay element. The two signals are not in phase with each other when deformation exists in the surface-of-interest 305.

Figure 9:
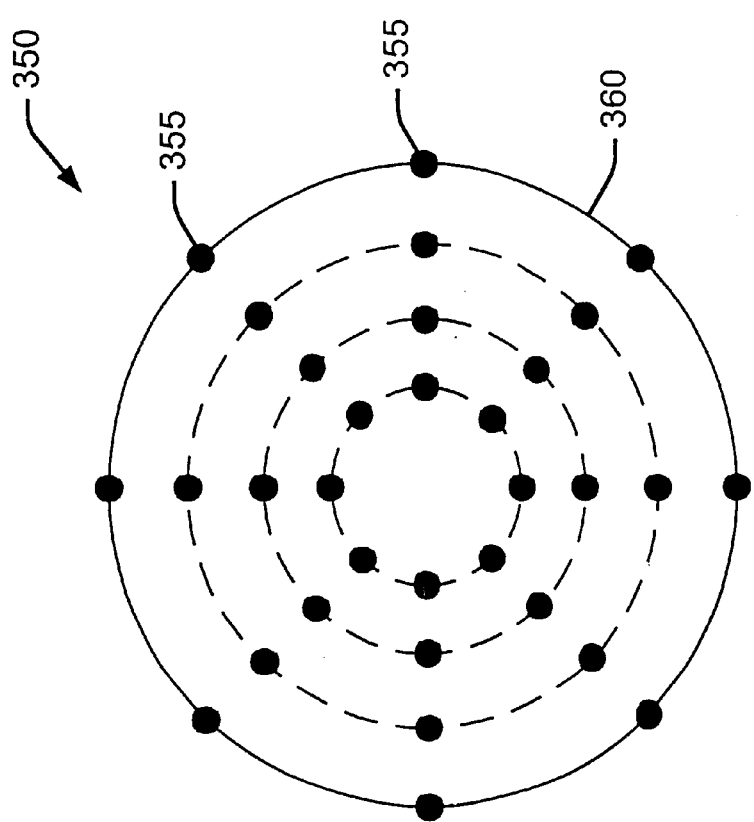
FIG. 9 shows an array of displacement sensors mounted to a parabolic antenna.

FIG. 9 shows an antenna having an array of 2D displacement sensors 355 mounted to its primary mirror 360. The array of sensors 355 are used to create profiles of the antenna's shape, both when resting and when experiencing deforming forces. In the example shown here, the displacement sensors 355 are arranged in concentric circular patterns around the centroid of the antenna's primary mirror 360. A laser source (not shown) placed at the focal point of the antenna's primary mirror 360 delivers a pulse-modulated or frequency-modulated laser beam to an optical head (not shown). The optical head includes a series of beam splitters that deliver a portion of the laser beam to each of the sensors 355 in the array. Each circular pattern of sensors provides a conical section profile of the antenna's deformation. The modulation frequency is selected so that the displacement measurement occurs at a phase of less $\pi/4$ for each circular pattern of sensors on the antenna.

A reference profile of the antenna 350 is formed by measuring the distance between each sensor and the laser source when the antenna is under minimal stress, or is "resting." The antenna is resting when gravitational forces are equal throughout the antenna and solar thermal effects are at a minimum. Therefore, the reference profile is formed by measuring and storing the sensor displacements at night after positioning the antenna for gravitational equilibrium. Deformation in the antenna is measured by calculating the sensor displacements during normal operation to form a profile of the antenna and then comparing this profile to the reference profile. Alternatively, the reference profile is formed from a mathematical construct, representing the antenna at rest.

One alternative configuration for the system of FIG. 8 replaces the array of sensors 355 on the antenna's primary mirror with an array of smaller mirrors. In this configuration, the sensors are placed behind the antenna's secondary mirror, near the laser source. The laser source projects a laser beam through an optical head toward each of the mirrors mounted on the primary mirror. The mirrors are positioned to reflect the laser beam from the primary mirror back toward the array of sensors near the laser source.

A number of embodiments of the invention are described above. A person of ordinary skill will recognize that various modifications are possible without departing from the spirit and scope of the invention. For example, the signal reception system described here is only one example of the types of devices in which the invention is useful. Other applications include a wide variety of signal acquisition systems, including optical detection and imaging systems, such as video cameras and intrusion alarm systems. Accordingly, other embodiments are within the scope of the following claims.

What is claimed is:

1. A system for use in measuring physical displacement in three dimensions comprising:
    an optical signal source configured to produce an optical signal having a characteristic feature that varies with distance traveled by the optical signal;
    a target optical sensor positioned to receive at least a portion of the optical signal and configured to produce an output signal indicating a position at which the optical signal strikes the sensor in each of two orthogonal dimensions, where the target sensor is subject to displacement in a third orthogonal dimension; and
    circuitry connected to receive the output signal and configured to:
        derive information about the characteristic feature of the optical signal at the target sensor;
        apply the information in calculating a linear distance traveled by the optical signal in the third orthogonal dimension; and
        derive from the linear distance an amount by which the target sensor has been displaced in the third orthogonal dimension.

2. The system of claim 1, wherein the characteristic feature that varies with linear distance traveled is actual time elapsed between a selected reference time and a time at which the optical signal strikes the target sensor.

3. The system of claim 2, further comprising a storage device containing information that indicates a nominal time elapsed when no displacement of the target sensor has occurred.

4. The system of claim 2, further comprising a reference sensor positioned a predetermined linear distance from the optical signal source and configured to produce an output signal upon receiving a portion of the optical signal.

5. The system of claim 4, wherein the circuitry is configured to calculate time elapsed between creation of an output signal by the reference sensor and creation of an output signal by the target sensor.

6. The system of claim 1, wherein the characteristic feature that varies with linear distance traveled is phase.

7. The system of claim 6, wherein the circuitry includes a component configured to calculate phase of the optical signal at the target sensor with respect to a reference phase.

8. The system of claim 7, wherein the circuitry includes a component configured to measure phase of the optical signal at a reference position that is separated from the optical signal source by a predetermined linear distance.

9. The system of claim 1, wherein the circuitry includes a correlation element configured to produce an output signal indicating an amount of correlation between the characteristic feature of the optical signal at the target sensor and the characteristic feature of the optical signal at a reference point.

10. A method for use in measuring physical displacement in three dimensions comprising:
    producing an optical signal having a characteristic feature that varies with distance traveled by the optical signal;
    directing at least a portion of the optical signal toward a target optical sensor, where the target sensor has a photosensitive surface that is subject to displacement in a direction orthogonal to the photosensitive surface, and where the target sensor generates an output signal indicating a position at which the optical signal strikes the photosensitive surface;
    receiving the output signal from the target sensor;
    deriving information from the output signal about the characteristic feature of the optical signal at the target sensor;
    using the information in calculating the distance traveled by the optical signal; and
    deriving from the linear distance an amount by which the target sensor has been displaced in the direction orthogonal to the photosensitive surface of the target sensor.

11. The method of claim 10, wherein the characteristic feature that varies with linear distance traveled is actual time elapsed between a selected reference time and a time at which the optical signal strikes the target sensor.

12. The method of claim 11, further comprising receiving a signal indicating an amount of time over which the optical signal travels between the optical signal source and a reference sensor and applying the amount of time as the selected reference time.

13. The method of claim 12, further comprising calculating time elapsed between creation of an output signal by the reference sensor and creation of an output signal by the target sensor.

14. The method of claim 10, wherein the characteristic feature that varies with linear distance traveled is phase.

15. The method of claim 14, further comprising calculating phase of the optical signal at the target sensor with respect to a reference phase.

16. The method of claim 15, further comprising measuring phase of the optical signal at a reference position that is separated from the optical signal source by a predetermined linear distance.

17. The method of claim 10, further comprising producing an output signal indicating an amount of correlation between the characteristic feature of the optical signal at the target sensor and the characteristic feature of the optical signal at a reference point.

* * * * *

UNITED STATES PATENT AND TRADEMARK OFFICE
CERTIFICATE OF CORRECTION

PATENT NO. : 6,429,942 B1
DATED : August 6, 2002
INVENTOR(S) : Schubert F. Soares It is certified that error appears in the above-identified patent and that said Letters Patent is hereby corrected as shown below:

Column 1,
Lines 11-17, please delete "STATEMENT AS TO …..elected to retain title."

Signed and Sealed this

Eighteenth Day of February, 2003

JAMES E. ROGAN
*Director of the United States Patent and Trademark Office*